United States Patent [19]

Schlenk et al.

[11] Patent Number: 4,694,193
[45] Date of Patent: Sep. 15, 1987

[54] FAULT RECOGNITION CIRCUIT FOR PARALLEL POWER SUPPLY DEVICES FEEDING A USER

[75] Inventors: Manfred Schlenk, Bobingen; P. N. R. Chadwick, Petzenhausen, both of Fed. Rep. of Germany

[73] Assignee: Siemens Aktiengesellschaft, Berlin and Munich, Fed. Rep. of Germany

[21] Appl. No.: 847,108

[22] Filed: Apr. 3, 1986

Related U.S. Application Data

[63] Continuation of Ser. No. 609,425, May 11, 1984, abandoned.

[30] Foreign Application Priority Data

May 27, 1983 [DE] Fed. Rep. of Germany ....... 3319306

[51] Int. Cl.$^4$ .......................... G05F 1/64; H02M 7/23
[52] U.S. Cl. ........................ 307/62; 307/64; 307/66; 307/87; 363/39; 323/285
[58] Field of Search .................... 307/17, 29, 31, 34, 307/35, 38, 39, 40, 41, 46, 47, 48, 51, 52, 57, 58, 59, 64, 66, 82, 83, 84, 85, 86, 87, 62; 361/90; 363/78–80, 21, 126, 26, 16, 39, 47, 86; 323/273, 275, 276, 277, 280, 282, 285, 286, 266; 333/166, 167, 181

[56] References Cited

U.S. PATENT DOCUMENTS

| | | | |
|---|---|---|---|
| 3,790,878 | 2/1974 | Brokaw | 323/285 X |
| 3,818,306 | 6/1974 | Marini | 323/266 X |
| 3,867,684 | 2/1975 | Ginsberg et al. | 363/80 |
| 3,903,470 | 9/1975 | Mirabile et al. | 324/103 P X |
| 4,055,733 | 10/1977 | Holsinger et al. | 324/99 D X |
| 4,065,682 | 12/1977 | Evans | 324/103 P X |
| 4,150,412 | 4/1979 | Hammarlund | 361/76 |
| 4,177,389 | 12/1979 | Schott | 307/64 |
| 4,213,173 | 7/1980 | Link et al. | 363/171 X |
| 4,236,111 | 11/1980 | Kusserow | 324/103 P |
| 4,241,372 | 12/1980 | Sears | 361/18 X |
| 4,276,590 | 6/1981 | Hansel et al. | 307/82 X |
| 4,315,220 | 2/1982 | Findeisen | 324/103 P X |
| 4,328,537 | 5/1982 | Schmidtner et al. | 363/21 |
| 4,374,346 | 2/1983 | Tsuchiya et al. | 363/39 X |
| 4,473,756 | 9/1984 | Brigden et al. | 307/66 |
| 4,502,086 | 2/1985 | Ebisaka | 361/86 X |
| 4,562,548 | 12/1985 | Anderson et al. | 361/18 X |
| 4,568,877 | 2/1986 | Tinsley | 324/76 R |
| 4,583,004 | 4/1986 | Yearsin | 307/87 X |

Primary Examiner—William M. Shoop, Jr.
Assistant Examiner—Shik Luen Paul Ip
Attorney, Agent, or Firm—Hill, Van Santen, Steadman & Simpson

[57] ABSTRACT

The invention relates to a fault recognition circuit for at least two power supplies feeding in parallel a user at an output side. The power supplies each have an electronic switch, a power transformer and a rectifier portion with a following filter element. In order to achieve short repair times, the respective down power supply is immediately identified after the outage of one of the parallel power supplies. For this purpose, a current transformer is provided which lies between the electronic switch and the power transformer. The load voltage of the current transformer is supplied to first a rectifier unit and the ac voltage component of the unfiltered dc voltage at the rectifier portion of the power pack units is supplied via a high pass filter to a second rectifier unit. The outputs of the rectifier units are connected to inputs of first and second comparators, and the other inputs of the comparators are connected with comparison voltages. The outputs of the first and second comparators are connected to the inputs of an evaluation circuit. The outputs of all evaluation circuits are connected to an external central power supply control situated, for example, in a data processing system. The central power supply control in turn influences a respective control and regulating unit of the electronic switch in the respective power supply.

8 Claims, 5 Drawing Figures

FIG 3
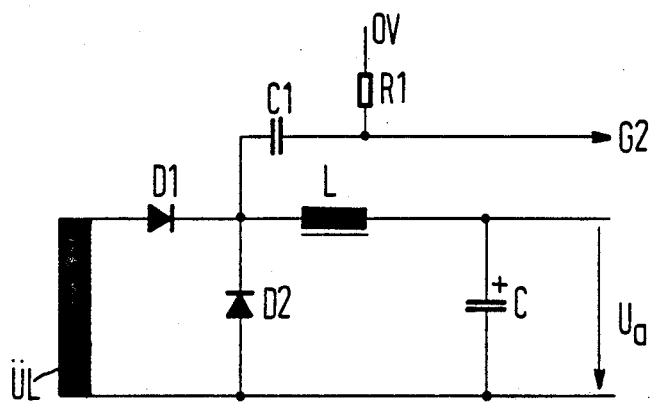
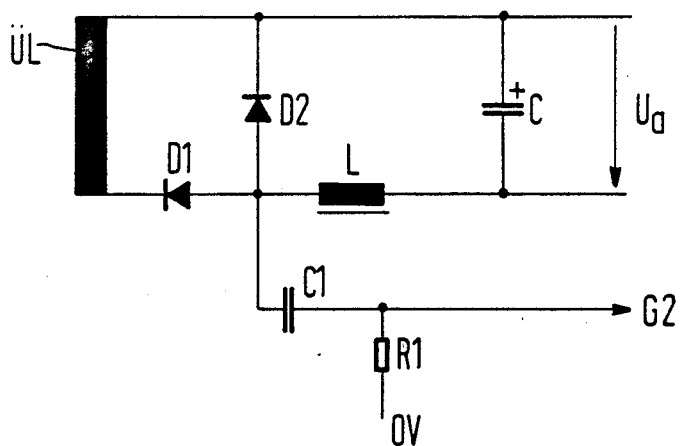

FAULT RECOGNITION CIRCUIT FOR PARALLEL POWER SUPPLY DEVICES FEEDING A USER

This is a continuation of application Ser. No. 609,425 filed May 11, 1984, now abandoned.

BACKGROUND OF THE INVENTION

The invention relates to a fault recognition circuit for at least two power supply units feeding a user at their output side, the power supply units having a switching transistor, a power transformer, and a rectifier portion with a following filter element.

The trend toward higher power densities and the high availability demands of data processing systems necessarily requires the connection of a plurality of power supply units in parallel. The relationship between costs and availability thus decides whether a system of power supply units connected in parallel be redundantly designed. Since high availability of a system simultaneously means short repair times, it is decisive, among other things, that the power supply unit which is down be immediately recognized after outage.

SUMMARY OF THE INVENTION

An object of the invention is to create a fault recognition circuit for power supply units connected in parallel at their output side which feed users, the fault recognition circuit enabling an unequivocal and fast detection of faulty power supply units.

In order to achieve this objective, the fault recognition circuit according to the invention is designed such that a current transformer respectively lies between a switching transistor and a power transformer of the power supply, the load voltage of the current transformer being supplied to first rectifiers and the ac voltage component of the non-filtered dc voltage at the rectifier portion is supplied to second rectifiers via a high pass filter. The outputs of the rectifiers are connected to the non-inverting inputs of first and second comparators. The non-inverting input of the first comparators is charged with a comparison voltage that is higher than the test voltage that arises due to the magnetizing current of the power transformer. The non-inverting input of the second comparator is connected with a second comparison voltage that is lower than the ac voltage component of the non-filtered dc voltage that appears given the minimum permissable power input voltage of the device. The outputs of the first and second comparators are respectively connected to the input of an evaluation circuit. The outputs of all evaluation circuits are connected to an external power supply control means situated, for example, in a data processing system, the power supply control means in turn influencing the respective control and regulation units of the switching transistors.

Furthermore, a high pass filter can be pre-connected to the first rectifier, and can be dimensioned such that the signal shape of the ac voltage component of the unfiltered dc voltage remains undistorted.

The rectifiers can thus advantageously be peak-responding rectifiers.

The supervision of the operational status of a power supply unit is enabled by means of these tecniques without adjustments at the individual devices being required given an interconnected power supply means. In order to prevent an erroneous emission of signals due to the output ripple of the meter rectifier, the comparators can be wired such that they exhibit a hysteresis.

The comparison voltage for the two components can be expediently generated via voltage dividers from the stabilized supply voltage.

The evaluation circuit can thus comprise a NOR gate whose output is connected to an opto-coupler via an ohmic resistor. The inherent supply of the power supply can thus be simultaneously monitored in simple fashion.

It is advantageous in a further development of the invention to design the fault recognition circuit such that the central power supply control means comprises a central fault evaluation circuit which contains AND gates in accordance with the number of parallel power supply units, the first inputs of the AND gates being coupled to the respective outputs of the evaluation circuit, their second inputs being connected to one another and to the output of a further AND gate, and their third input being suppliable with an interlock signal. The outputs of the AND gates are connected to the setting inputs of following RS flip-flops and their reset inputs are connected to one another. The outputs of the RS flip-flops are connected to the inputs of the further AND gate as well as to a display.

The invention shall be explained in greater detail with reference to the embodiments according to FIGS. 1, 2, 3 and 5 as well as a flow chart according to FIG. 4.

BRIEF DESCRIPTION OF THE DRAWINGS

FIG. 3 shows various coupling out possibilities of the ac voltage component of the unfiltered dc voltage;

DESCRIPTION OF THE PREFERRED EMBODIMENTS

Figure 1:
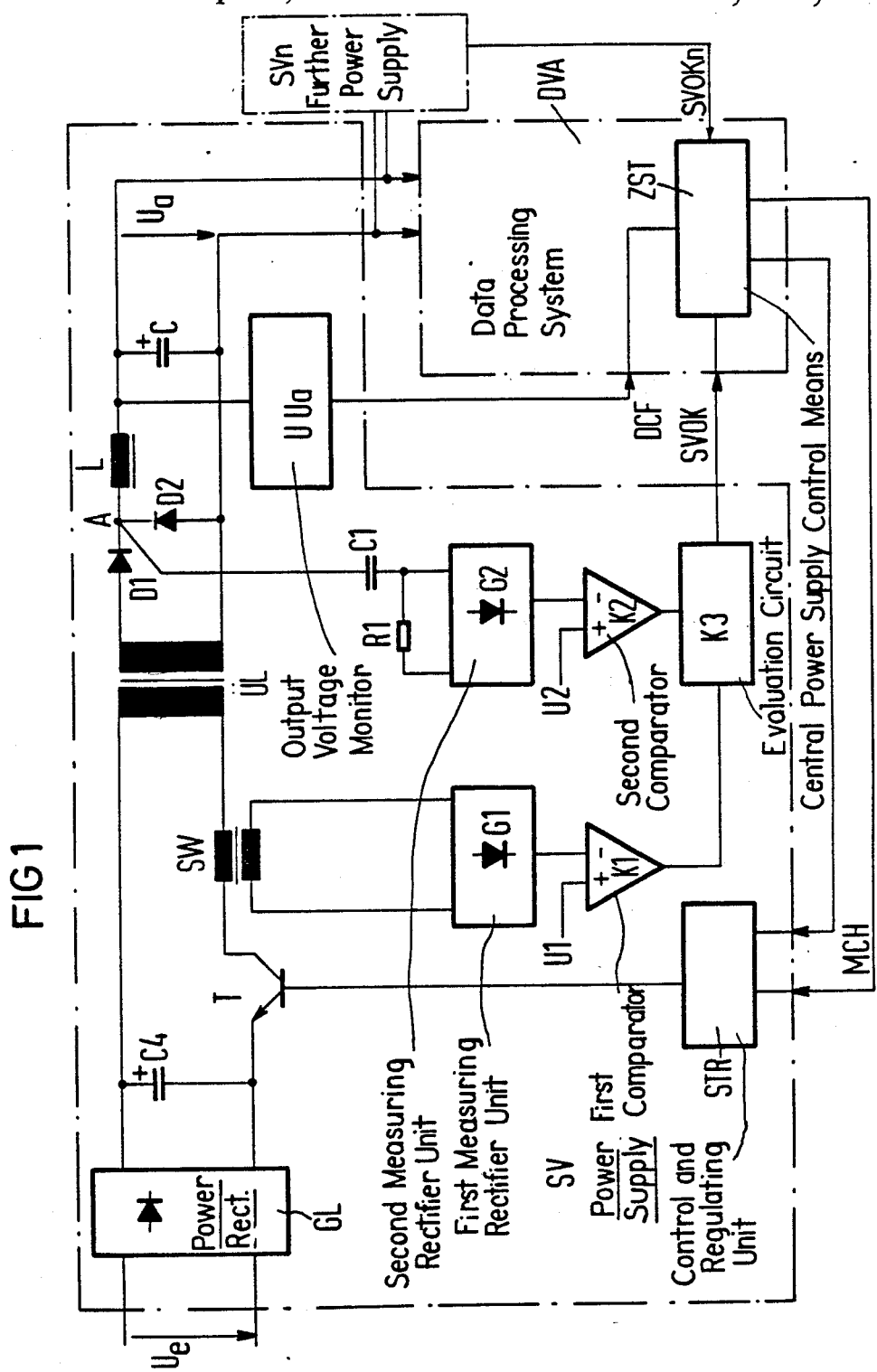
FIG. 1 is a block diagram of the fault recognition circuit.

FIG. 1 shows a fault recognition circuit with reference to a power supply device SV designed as a power pack unit and at least one further power supply device $SV_v$ connecting in parallel to a user DVA.

The line voltage UE is supplied via the power rectifier GL to the switch controller which consists of the switching transistor T, the power transformer UL, the rectifier portion D1, D2 and the filter element LC. A capacitor C4 follows the power rectifier GL for the purpose of filtering. The current transformer SW is connected between the switching transistor T and the power transformer UL, the load voltage of said current transformer SW being supplied to the first measuring rectifier G1 whose output is connected to the inverting input of the first comparator K1. The first comparison voltage U1 is present at the non-inverting input of this comparator. The ac voltage component of the unfiltered dc voltage is taken via the high pass filter C1, R1 at the point A of the rectifier portion of the power pack unit and is supplied to the second measuring rectifier G2 whose output is connected to the inverting input of the second comparator K2, and whose non-inverting input is likewise connected to a second comparison voltage U2. At their ouput side, the two comparators K1, K2 are connected to an evaluation circuit K3 whose output is connected to the external, central power supply control means ZST which is located in a data processing system DVA as a user to which the power supplies are connected in parallel. The central power supply control means ZST in turn influenes the control and regulating means STR for the switching transistor T, as shall be explained in greater detail later.

The ac voltage at point A is detected with the second rectifier G2 and is compared to the second comparison voltage U2. It should be taken into consideration in the selection of the second comparison voltage U2 that it is selected lower than the ac voltage at point A which appears given the minimal permissable line input voltage of the device. When a voltage that is higher than the second comparison voltage U2 builds up at the inverting input of the second comparator K2 then a short-circuit exists neither on the primary side nor on the secondary side in the power pack unit, and the diode D1 is not open.

When an interruption exists somewhere in the secondary circuit (choke L, leads to the output terminals), this is detected by means of measuring the primary power flux. For this purpose, the primary current of the power pack unit SV is measured by means of a current transformer SW and is subsequently rectified with the assistance of a first rectifier G1.

When the first comparison voltage U1 is selected such that it is higher than the test voltage that arises due to the magnetizing current of the power transformer, then—in case there is a power flux to the user—a test voltage builds up at the inverting input of the first comparator K1, said test voltage being higher than the first comparison voltage U1. If an interruption exists and no user current is drawn, this is detected by K1 since the test voltage corresponds substantially only to the magnetizing current (a test voltage lower than the comparison voltage).

Both criteria are combined with the evaluation circuit K3, and the operational readiness of the power pack unit (SVOK) is communicated to the data processing system DVA.

When the power supply system is redundantly designed, the power supply unit having the lowest intended voltage value makes no contribution to the overall current of the system, as is known, insofar as no techniques are undertaken for a uniform load distribution. The redundant device will therefore report as being down. In order to check whether a device is down or redundant, each power supply unit SV of the overall system must be induced to accept current at specific time intervals. This meaningfully occurs such that the intended value of the individual power supplies is briefly increased by means of a marginal-check command MCH.

Given a non-redundant power supply system, the outage of a power supply unit SV leads to the overall outage of the data processing system. The identification of the unit that leads to the system outage can ensue in two different ways:

(1) The first alarm message is stored and displayed.

(2) After the outage of the data processing system, each power supply unit is switched on again. The down unit will report with $\overline{SVOK}$. This is in turn stored and displayed.

The unit U Ua shown in FIG. 1 monitors the output voltage of the inductor L and, with the aid of the emitted signal DCF, in the case of overload switches the central control assembly EST off.

The control and regulating unit STR shown in FIG. 1 controls and regulates the transistors in conventional fashion. For example, an integrated circuit can be employed which is available under the designation TDA1060.

Figure 2:
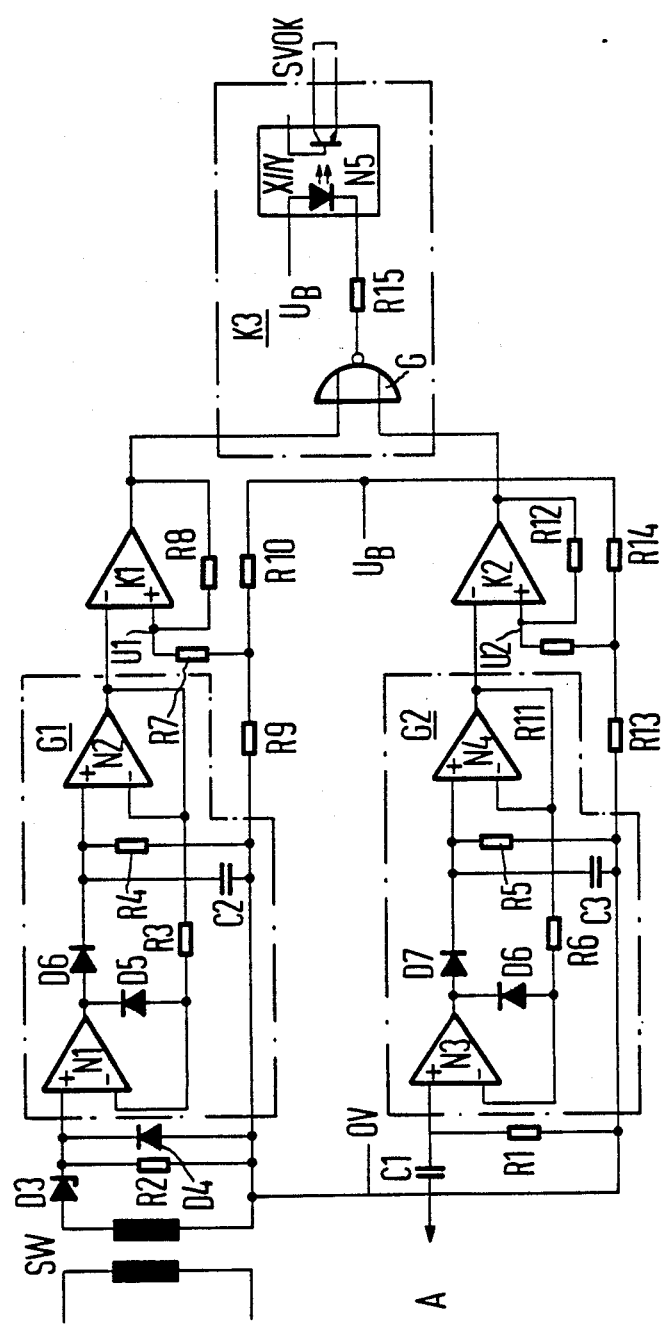
FIG. 2 is a detailed circuit diagram of the first and second rectifiers, of the comparators, and of the evaluation circuit.

FIG. 2 shows an examplary embodiment of the circuit according to the invention. The second rectifier G2 is capacitively connected in order to measure only the ac voltage component at point A. The high pass filter R1, C1 is selected such that the signal shape of the ac voltage is transmitted in undistorted fashion. The capacitive coupling at point A also has the advantage at the same time that the same test circuit can always be employed regardless of whether the inductor L lies in the positive or negative current path, or in both. FIG. 3 shows this.

A precision peak-responding rectifier as corresponds to the known prior art is employed as the second rectifier G2. In order to prevent an erroneous emission of the signal SVOK due to the output ripple of the measuring rectifier, the second comparator K2 has a hysteresis that is formed by means of the resistors R11 and R12. The second comparison voltage U2 is acquired via the voltage dividers R14, R13 from the stabiliized supply voltage $U_B$. Since the output voltage of the second rectifier G2 is present at the inverting input of the second comparator K2, the output of the second comparator K2 assumes a level L when as ac voltage builds up at point A.

The Zener diode D3, the diode D4, and the load resistor R2 represent the current transformer wiring, as corresponds to the known prior art. Rectifier G1 is also designed as a peak-responding rectifier. The hysteresis of the first comparator K1 is formed by means of the resistors R7 and R8. The comparison voltage U1 is acquried from the stabilized supply voltage $U_B$ by means of the voltage divider R9, R10. When the primary current of the power pack unit lies above the magnetizing current, then the output of the first comparator K1 likewise assumes the level L.

The outputs of the two comparators K1 and K2 are combined with the NOR gate G. When there is no fault in the power supply SV, then the output of the NOR gate G assumes the level L, current flows via the resistor R15 into the light-emitting diode LED of the opto-coupler N5, and the phototransistor of the opto-coupler N5 is driven. In addition to the known advantages of an opto-coupler—reduction of common-mode interference and potential-free signal transmission—the inherent voltage supply ($U_B$) of the power supply can also be monitored at the same time in a simple fashion. $U_B$ is a stabilized supply voltage.

Figure 4:
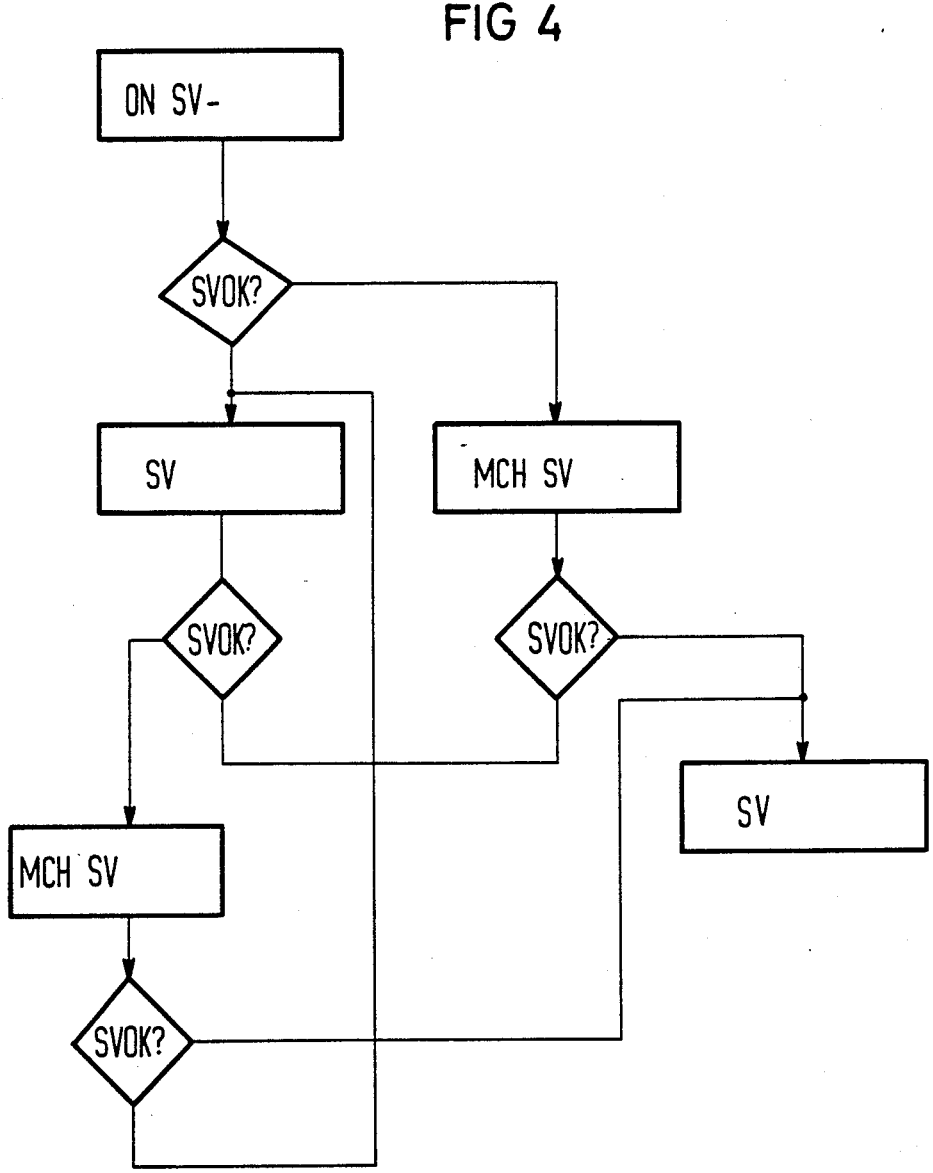
FIG. 4 is a flow chart.

FIG. 4 shows a possible test routine given a power supply system having redundant power pack units, said routine being executed by the central power supply control (ZST). After the start command (ON) for the overall power supply system, the signals SVOK of the individual power pack units are interrogated. Since the redundant unit will report a fault, the central power supply control ZST increases the intended or rated values MCH of this unit. When the signal SVOK also appears given this unit, then the overall system is in order at this point in time. After this initial test of the power supply system, the intended or rated voltage value of each individual unit is increased at regular chronological intervals since the same unit need not always function redundantly due to dynamic events in the data processing system. A down unit is displayed.

In the flow charge shown in FIG. 4 the box indicating "MCH SV individually" indicates that in the case of several current supply apparatuses which are feeding in parallel, the pulse MCH is respectively transmitted in chronologically offset fashion in succession to the individual control and regulating installations STR of the individual switching network parts in order to check the operating capability of each individual circuit network part.

Figure 5:
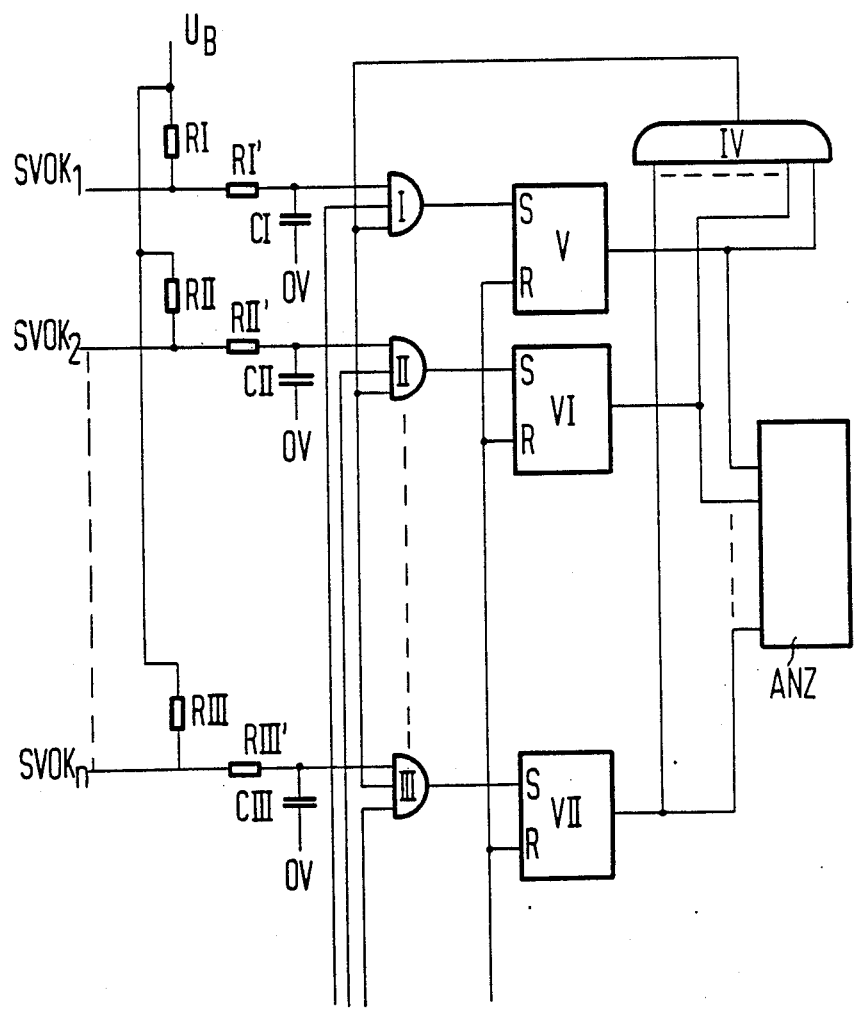
FIG. 5 is a circuit diagram of the fault evaluation circuit.

FIG. 5 shows a possible technical circuit embodiment of the fault evaluation scheme according to FIG. 4. When all power pack units report SVOK, then the outputs of the AND gates I, II, III assume the level L, and the outputs of the RS flip-flops V, VI, VII assume the level H as does the output of the And gate IV. The report $\overline{SVOK}$ of a redundant power pack unit can be suppressed with the level L at the interlock inputs E1, E2, E3 of the And gates I, II, III. The suppression is in turn cancelled during the MCH mode. When an alarm message appears during a MCH cycle, then the output of the corresponding RS flip-flop assumes the level L. This is displayed by a display ANZ and a further fault acquisition is suppressed via gate IV.

The three lead lines in FIG. 5 at the bottom thereof leading up to the gates I, II, and III originate at a locking assembly if redundant systems are employed. The line going to the reset "R" of the flip-flops is employed for a reset pulse.

In FIG. 5, only a portion of the control installation CFT is shown—namely that part which evaluates the signals SVOK. The interlock signal can suppress the reporting of redundant current supply apparatuses and can cancel this again during the MCH operation.

The evaluation circuit according to FIG. 5 can be employed for a non-redundant power supply system when the interlock inputs are applied to the level H. The evaluation circuit then identifies the device that caused the system outage.

While various minor changes and modifications might be proposed by those skilled in the art, it will be understood that we wish to include within the claims of the patent warranted hereon all such changes and modifications as reasonably come within our contribution to the art.

We claim as our invention:

1. A fault recognition system, comprising:
    at least two power supplies connected in parallel to a user at their outputs, each of the power supplies having at least one electronic switch, a power transformer, and a rectifier portion with a following filter;
    each of the power supplies having
        a control and regulating means connected to the electronic switch for controlling the same,
        a current transformer connected between said electronic switch and said power transformer, a load side voltage of said current transformer being supplied to a first rectifier means,
        high pass filter means for supplying an ac voltage component of an unfiltered dc voltage at the rectifier portion to a second rectifier means,
        outputs of the first and second rectifier means being connected to first inputs of first and second comparators,
        a second input of the first comparator being connected with a first comparison voltage that is higher than a test voltage that arises due to a magnetizing current of the power transformer so as to detect when substantially only magnetizing current is being supplied and thus a possible open circuit to the user, and a second input of the second comparator being connected with a second comparison voltage that is lower than the ac voltage component of the unfiltered dc voltage which appears given a minimum permissible line input voltage of the power supply, and
    outputs of the first and second comparators being connected to respective first and second inputs of an evaluation circuit; and
    an output of the evaluation circuit in the power supplies being connected to an external power supply control means for influencing the respective control and regulating means in the respective power supply.

2. A fault recognition system according to claim 1 wherein the high pass filter means preceding the second rectifier means is dimensioned such that a signal shape of the ac voltage component of the unfiltered dc voltage remains substantially unaffected.

3. A fault recognition system according to claim 1 wherein the first and second rectifier means are peak-responding rectifiers.

4. A fault recognition system according to claim 1 wherein the first and second comparators have means for providing hysteresis.

5. A fault recognition system according to claim 1 wherein the first and second comparison voltages are generated via voltage divider means from a stabilized supply voltage.

6. A fault recognition system according to claim 1 wherein the evaluation circuit comprises a NOR gate whose output is connected to an opto-coupler via an ohmic resistor.

7. A fault recognition system according to claim 1 wherein the external power supply control means comprises a central fault evaluation means which contains a number of input AND gates corresponding to the number of parallel power supples, a first input of each of said input AND gates being coupled to respective outputs of the evaluation circuits, second inputs being connected to one another and to an output of a further AND gate, and third inputs thereof being connected to an interlock signal; outputs of the input AND gates being connected to setting inputs of following RS flip-flops and their reset inputs being connected to one another; and outputs of the RS flip-flops being connected to inputs of the further AND gate as well as to a display means.

8. A fault recognition system , comprising:
    at least two power supplies connected in parallel to a user at their outputs, each of the power supplies having at least one electronic switch, a power transformer, and a rectifier portion with a following filter;
    each of the power supplies having
        a control and regulating unit for controlling the electronic switch,
        a current transformer connected between the electronic switch and power transformer for feeding a control voltage through first rectifier means to a first comparator having a first comparison voltage also connected thereto selected so as to detect when substantially only a magnetizing current is flowing through a primary of the transformer and substantially no user current is being drawn, filter means connected to the rectifier portion for providing an ac voltage component through a second rectifier means to a second comparator for comparison with a second comparison voltage, and evaluation circuit means connected to outputs of the first and second comparators and providing an operational readiness signal; and a central power supply control means connected to receive the operational readiness signals from the evaluation circuit of the power supplies and for outputting control signals to the control and regulating unit.

* * * * *